United States Patent
Kothandaraman et al.

(10) Patent No.: US 10,142,335 B2
(45) Date of Patent: Nov. 27, 2018

(54) DYNAMIC INTRINSIC CHIP IDENTIFICATION

(71) Applicant: International Business Machines Corporation, Armonk, NY (US)

(72) Inventors: Chandrasekharan Kothandaraman, New York, NY (US); Sami Rosenblatt, White Plains, NY (US); Rasit O. Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/975,512

(22) Filed: Dec. 18, 2015

(65) Prior Publication Data

US 2017/0180369 A1    Jun. 22, 2017

(51) Int. Cl.
*H04L 29/06* (2006.01)
(52) U.S. Cl.
CPC ............................... *H04L 63/0876* (2013.01)
(58) Field of Classification Search
CPC .................................................. H04L 63/0876
See application file for complete search history.

(56) References Cited

U.S. PATENT DOCUMENTS

| | | |
|---|---|---|
| 8,339,875 B2 | 12/2012 | Tuyls et al. |
| 8,981,810 B1 | 3/2015 | Trimberger et al. |
| 9,082,514 B1 | 7/2015 | Trimberger |
| 2010/0293335 A1* | 11/2010 | Muthiah ............. G06F 12/0813 711/133 |
| 2014/0041040 A1 | 2/2014 | Potkonjak et al. |
| 2014/0165141 A1* | 6/2014 | Chellappa ............... G06F 21/44 726/2 |

(Continued)

OTHER PUBLICATIONS

Maes, "Physically Unclonable Functions: Concept and Constructions", Physically Unclonable Functions, Springer Berlin Heidelberg, 2013, pp. 11-48.

(Continued)

*Primary Examiner* — Mohammed Waliullah
(74) *Attorney, Agent, or Firm* — Kunzler, PC (57) ABSTRACT

An apparatus, method, system, and program product are disclosed for intrinsic chip identification. One method includes receiving first counter information from a device, determining whether such information matches second counter information, receiving first frequencies from the device, determining whether each frequency of such frequencies is within a predetermined range of a corresponding frequency of second frequencies, receiving a response to a challenge sent to the device, determining whether the response matches an expected response, and granting authentication. Granting authentication may include granting authentication in response to: the first counter information matching the second counter information; each frequency of the first frequencies being within the predetermined range of a corresponding frequency of the second frequencies; and the expected response matching the response. The expected response may be updated over time. The security apparatus may include circuitry that is shared with circuitry outside the security apparatus for computations other than authentication.

15 Claims, 6 Drawing Sheets

(56) References Cited

U.S. PATENT DOCUMENTS

2014/0225639 A1    8/2014  Guo et al.

OTHER PUBLICATIONS

Maiti et al, "The Impact of Aging on a Physical Unclonable Function", Very Large Scale Integration (VLSI) Systems, IEEE Transactions on 22.9 (2014), pp. 1854-1864.
Mathew et al., "16.2 A 0.19 pJ/b PVT-Variation-Tolerant Hybrid Physically Unclonable Function Circuit for 100% Stable Secure Key Generation in 22nm CMOS", Solid-State Circuits Conference Digest of TEchnical Papers (ISSCC), 2014 IEEE International, IEEEE, 2014.
Rahman et al, "An Aging-Resistant RO-PUF for Reliable Key Generation", Emerging Topics in Computing, IEEE Transactions on (vol. PP, Issue: 99) Sep. 02, 2015.
Xu et al., "Reliable Physical Unclonable Functions using Data Retention Voltage of SRAM Cells", Computer-Aided Design of Integrated Circuits and Systems, IEEE Transactions on (vol. 34, Issue: 6) (2015).
Kirkpatrick et al, "Software Techniques to Combat Drift in PUF-Based Authentication Systems", Workshop on Secure Component and System Identification (SECSI 2010) Cologen, Germany, 2010.

\* cited by examiner

FIG. 7

DYNAMIC INTRINSIC CHIP IDENTIFICATION

FIELD

The subject matter disclosed herein relates to intrinsic chips and more particularly relates to dynamic intrinsic chip identification.

BACKGROUND

Intrinsic chip identifiers ("IDs") may be used to complete secure authentication. In some configurations, an intrinsic chip identifier may be used to perform a physically unclonable function ("PUF").

BRIEF SUMMARY

A method for intrinsic chip identification is disclosed. An apparatus and computer program product may also perform the functions of the method. In one embodiment, a method includes receiving first counter information from a device in response to requesting the first counter information from the device. The method, in a further embodiment, includes determining whether the first counter information matches second counter information. In various embodiments, the method includes receiving a first set of frequencies from the device in response to requesting the first set of frequencies from the device. In some embodiments, the method includes determining whether each frequency of the first set of frequencies is within a predetermined range of a corresponding frequency of a second set of frequencies. In certain embodiments, the method includes receiving a response to a challenge sent to the device. The method, in one embodiment, includes determining whether the response matches an expected response. In a further embodiment, the method includes granting authentication in response to: the first counter information matching the second counter information; each frequency of the first set of frequencies being within the predetermined range of a corresponding frequency of the second set of frequencies; and the expected response matching the response.

A method for updating intrinsic chip identification is disclosed. An apparatus and computer program product may also perform the functions of the method. In one embodiment, the method includes receiving a response and output frequencies used to generate the response as a result of a challenge being sent to a device. In various embodiments, the method includes determining whether the output frequencies match historical data corresponding to the output frequencies. The method may include, as a result of the output frequencies not matching the historical data, determining whether the response matches a predicted response based on the challenge, the output frequencies, and the historical data. In certain embodiments, the method may include, as a result of the response matching the predicted response, updating the output frequencies in the historical data.

A system for using an intrinsic chip identification device is disclosed. A method and computer program product may also perform the functions of the system. In one embodiment, the system includes a processor and a first memory having program instructions embodied therewith. The program instructions may be executable by the processor. In various embodiments, the system includes a security apparatus having circuitry configured to perform a physically unclonable function ("PUF"). In a further embodiment, the system uses the security apparatus to perform authentications and the processor uses the security apparatus while the security apparatus is not being used to perform authentications.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
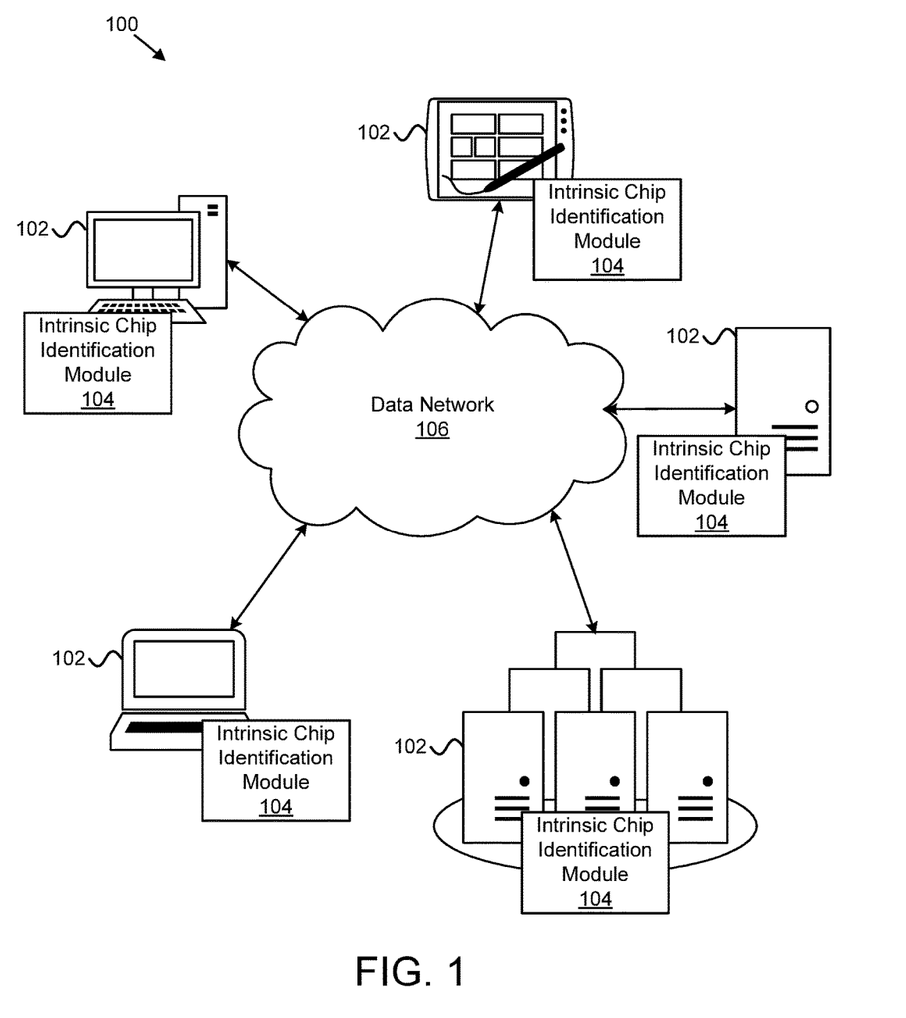
FIG. 1 is a schematic block diagram illustrating one embodiment of a system for intrinsic chip identification in accordance with one embodiment of the present invention.

FIG. 1 depicts one embodiment of a system 100 for intrinsic chip identification. In one embodiment, the system 100 includes information handling devices 102, intrinsic chip identification modules 104, and data networks 106. Even though a particular number of information handling devices 102, intrinsic chip identification modules 104, and data networks 106 are depicted in the system 100 of FIG. 1, one of skill in the art will recognize that any number or configuration of information handling devices 102, intrinsic chip identification modules 104, and data networks 106 may be present in the system 100.

The information handling devices 102, in certain embodiments, include computing devices, such as desktop computers, laptop computers, tablet computers, smart phones, smart televisions, or the like. The information handling devices 102 may also include servers, such as web servers, application servers, file servers, media servers, email servers, cloud servers, backup servers, virtual servers, or the like. In some embodiments, the information handling devices 102 may be part of a data center used for data storage, data backup, data replication, disaster recovery, mirroring, and/or the like. The information handling devices 102 may be located in geographically remote locations, in the same geographic location (e.g., the same data center), or some combination of both.

The information handling devices 102 may be configured to store data, backup data, replicate data, or the like. For example, the information handling devices 102 may be configured to perform synchronous or asynchronous data replication. In another example, information handling devices 102 may be configured as failover devices for one or more associated information handling devices 102. Moreover, the information handling devices 102 may include one or more storage volumes, storage devices, redundant array of independent disks ("RAID") devices or configurations, or the like, such as hard-disk drives, solid-state drives, flash memory devices, random-access memory ("RAM"), serial advanced technology attachment ("SATA") devices, tape devices, or the like. In some embodiments, the information handling devices 102 are in communication via one or more data networks 106, described below.

In one embodiment, the intrinsic chip identification module 104 receives first counter information from a device in response to requesting the first counter information from the device. The intrinsic chip identification module 104 determines whether the first counter information matches second counter information. The intrinsic chip identification module 104 may also receive a first set of frequencies from the device in response to requesting the first set of frequencies from the device. The intrinsic chip identification module 104 determines whether each frequency of the first set of frequencies is within a predetermined range of a corresponding frequency of a second set of frequencies. The intrinsic chip identification module 104 may receive a response to a challenge sent to the device. The intrinsic chip identification module 104 determines whether the response matches an expected response. The intrinsic chip identification module 104 grants authentication in response to: the first counter information matching the second counter information; each frequency of the first set of frequencies being within the predetermined range of a corresponding frequency of the second set of frequencies; and the expected response matching the response. In this manner, the intrinsic chip identification module 104 may facilitate secure authentication for intrinsic chips that may change IDs over time.

As may be appreciated, the intrinsic chip identification module 104 may be used in any suitable system 100. In certain embodiments, as described below with reference to FIGS. 2 and 3, the intrinsic chip identification module 104 includes multiple modules that perform the operations of the intrinsic chip identification module 104.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN"), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
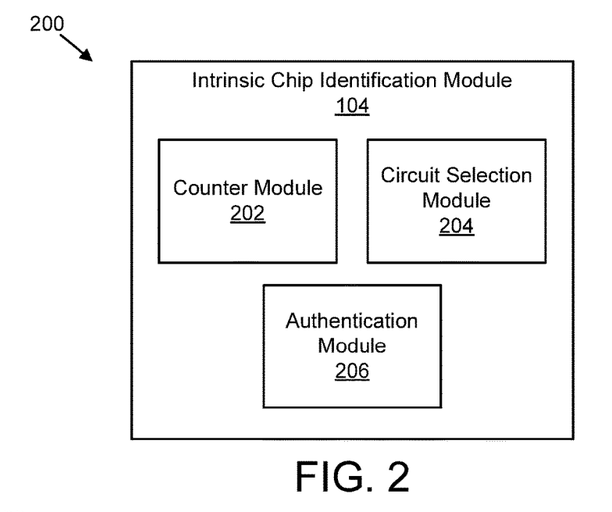
FIG. 2 is a schematic block diagram illustrating one embodiment of a module for intrinsic chip identification in accordance with one embodiment of the present invention.

FIG. 2 is a schematic block diagram illustrating one embodiment of a module 200 for intrinsic chip identification. In one embodiment, the module 200 includes an embodiment of an intrinsic chip identification module 104. The intrinsic chip identification module 104, in various embodiments, includes one or more of a counter module 202, a circuit selection module 204, and an authentication module 206, which are described in more detail below.

In one embodiment, the counter module 202 is used to keep a count that may be synchronized with another counter module 202 to facilitate authentication. For example, the counter module 202 may keep a count that is synchronized with a count of a security device (e.g., apparatus). In such an example, the security device may perform a physically unclonable function ("PUF"). One example of such a security device is described in FIG. 4. In various embodiments, the counter module 202 adjusts a count as part of an authentication. For example, the count may increase, decrease, or reset with each authentication. In certain embodiments, the counter module 202 may include any suitable circuitry and/or software for counting. In some embodiments, the counter module 202 may include a counter circuit. In such embodiments, the counter module 202 may include a number of flip-flops connected in cascade. The counter module 202 may include an integrated circuit used for counting. In various embodiments, the counter module 202 may include an asynchronous counter, a ripple counter, a decade counter, an up/down counter, a ring counter, a Johnson counter, a cascaded counter, a modulus counter, and so forth. In certain embodiments, the counter module 202 may include a software counter, a counter used as part of a finite-state machine, and so forth.

The circuit selection module 204, in one embodiment, is used to determine a set of frequencies that correspond to the count of the counter module 202. In certain embodiments, the circuit selection module 204 may include a memory device. The count of the counter module 202 may be used as an input to the memory device to select a memory location that stores information identifying a set of frequencies that may be produced from corresponding circuits. It should be noted that the memory device may be configured with information identifying the set of frequencies such that each count selects a different set of frequencies. The information identifying a set of frequencies may be a set of circuit numbers with each circuit number corresponding to a circuit that may produce an output frequency, among other things. The circuit number may be used to lookup information for the frequency that the circuit number relates to. For example, in one embodiment, the information identifying a set of frequencies may include the set of circuit numbers 5 and 25. Information about circuit number 5 may be looked up in the memory device to determine characteristics of the circuit, such as the frequency of the circuit number 5. Moreover, information about circuit number 25 may be looked up in the memory device to determine characteristics of the circuit, such as the frequency of the circuit number 25.

In certain embodiments, each circuit may correspond to a frequency produced by a ring oscillator ("RO"). In such embodiments, frequencies produced by each RO may be compared to frequencies stored by the circuit selection module 204 as part of an authentication process. For example, a security device may select a set of circuits using a circuit selection module 204. The selected set of circuits (e.g., ROs in the security device) may output a set of frequencies. The security device may provide the set of frequencies to the intrinsic chip identification module 104, and the intrinsic chip identification module 104 may compare the set of frequencies from the set of ROs to an expected set of frequencies. If each frequency of the set of frequencies from the set of ROs is within a predetermined range of a corresponding frequency of the expected set of frequencies, then one portion of authentication may be successful. As may be appreciated, small changes in the set of frequencies from the set of ROs may be used to update the frequencies stored in the circuit selection module 204 of the intrinsic chip identification module 104.

In some embodiments, the circuit selection module 204 may include a pseudo-random number generator ("PRNG"). The count of the counter module 202 may be used as an input to the PRNG to produce one or more random numbers for identifying a set of frequencies. In certain embodiments, the circuit selection module 204 may store information corresponding to any frequency that may be part of a set of frequencies. As may be appreciated, the circuit selection module 204 may be substantially similar to another circuit selection module 204 that is part of a security device. Accordingly, because the count between the counter module 202 and the security device are synchronized, the set of circuits selected by the circuit selection module 204 and the set of circuits selected by the security device will also be the same.

The authentication module 206, in one embodiment, is used to authenticate a security device. In one embodiment, a part of authentication may include the authentication module 206 verifying that a count of the security device matches a count of the counter module 202. In another embodiment, a part of authentication may include the authentication module 206 verifying that a set of frequencies received by the intrinsic chip identification module 104 from the security device is within a predetermined range of corresponding frequencies stored by the intrinsic chip identification module 206. In a further embodiment, one part of authentication may include the intrinsic chip identification module 104 sending a challenge to the security device and the security device providing a response to the intrinsic chip identification module 104. The authentication module 206 may verify that the response to the challenge matches a challenge/response pair stored by the intrinsic chip identification module 104. By using one or more portions of authentication described herein, the authentication module 206 may be used to authenticate the security device. In certain embodiments, authentication is only granted by the authentication module 206 if the count between the security device and the counter module 202 matches, the set of frequencies received from the security device is within a predetermined range of the set of frequencies corresponding to the count of the counter module 202, and the response from the security device matches an expected response determined by the intrinsic chip identification module 104.

In certain embodiments, at least a portion of the counter module 202, the circuit selection module 204, and the authentication module 206 include one or more of hardware and executable code. In such embodiments, the executable code may be stored on one or more computer readable storage media.

Figure 3:
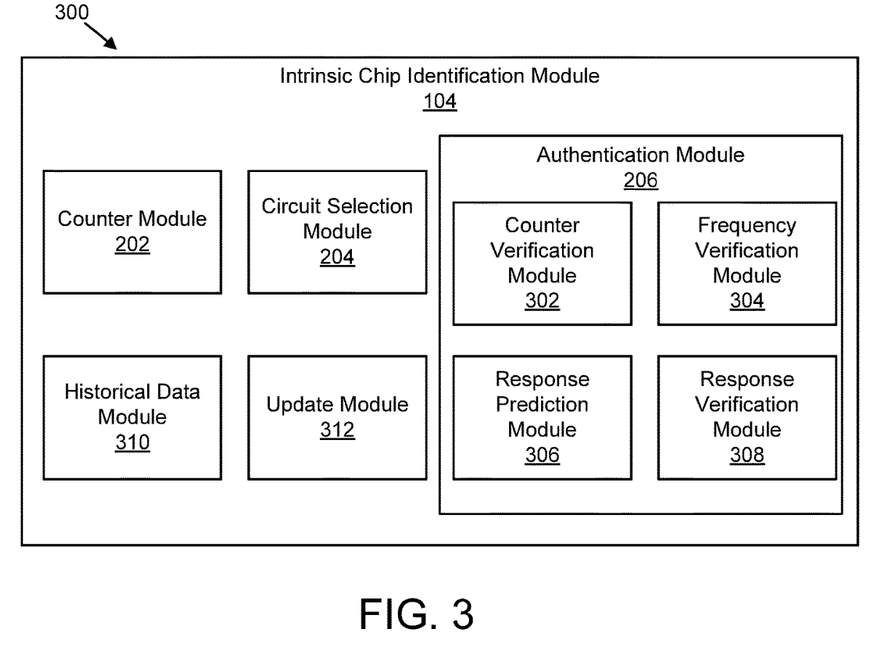
FIG. 3 is a schematic block diagram illustrating one embodiment of another module for intrinsic chip identification in accordance with one embodiment of the present invention.

FIG. 3 is a schematic block diagram illustrating one embodiment of another module 300 for intrinsic chip identification. In one embodiment, the module 300 includes an embodiment of an intrinsic chip identification module 104. The intrinsic chip identification module 104, in various embodiments, includes one or more of a counter module 202, a circuit selection module 204, and an authentication module 206, which may be substantially similar to the counter module 202, the circuit selection module 204, and the authentication module 206 described above. The intrinsic chip identification module 104 may also include one or more of a counter verification module 302, a frequency verification module 304, a response prediction module 306, a response verification module 308, a historical data module 310, and an update module 312, which are described in more detail below. As illustrated, the counter verification module 302, the frequency verification module 304, the response prediction module 306, and the response verification module 308 may be part of the authentication module 206.

In one embodiment, the counter verification module 302 is used to verify that a count of the security device matches a count of the counter module 202. Accordingly, the counter verification module 302 may receive the count of the security device as a first input and may receive the count of the counter module 202 as a second input. Moreover, the counter verification module 302 may provide a result indicating whether the count of the security device matches the count of the counter module 202. The result may be any suitable output indicating the result. The counter verification module 302 may include any suitable combination of circuitry and software. For example, in one embodiment, the counter verification module 302 may include any suitable comparator.

The frequency verification module 304, in certain embodiments, is used to verify that a set of frequencies received by the intrinsic chip identification module 104 from the security device is within a predetermined range of corresponding frequencies stored by the historical data module 310. Accordingly, the frequency verification module 304 may receive the set of frequencies from the security device as first inputs and may receive the set of frequencies from the circuit selection module 204 as second inputs. Moreover, the frequency verification module 304 may provide a result indicating whether each frequency of the set of frequencies from the security device is within a predetermined range of a corresponding frequency of the set of frequencies from the circuit selection module 204. The result may be any suitable output indicating the result. The frequency verification module 304 may include any suitable combination of circuitry and software. The predetermined range may be any suitable range useful to limit frequency differences to possible changes in frequency of the security device. For example, in one embodiment, the frequencies output from the security device may be lower than a compared frequency by approximately 1%, 2%, 5%, or 10%. In another embodiment, the frequencies output from the security device may not be greater than a compared frequency, or may be greater than a compared frequency by approximately 1%.

In one embodiment, the response prediction module 306 is used to determine what an expected response from the security device will be. In some embodiments, the expected response may be a response that corresponds to a challenge provided to the security device. As may be appreciated, challenge/response sets may be stored as part of the intrinsic chip identification module 104. In some embodiments, the response prediction module 306 may predict a change to the response based on changes to frequencies of the security device. For example, over time the frequencies produced by the security device may change, based on the changes to the frequencies produced by the security device, the response to a challenge may also change. Accordingly, by analyzing changes to frequencies produced by the security device over time, the response prediction module 306 may predict when changes to the response may occur.

The response verification module 308, in certain embodiments, is used to verify that the response received from the security device matches the expected response determined by the response prediction module 306. Accordingly, the response verification module 308 may receive the response from the security device as a first input and may receive the expected response from the response prediction module 306 as a second input. Moreover, the response verification module 308 may provide a result indicating whether the response from the security device matches the expected response from the response prediction module 306. The result may be any suitable output indicating the result. The response verification module 308 may include any suitable combination of circuitry and software. For example, in one embodiment, the response verification module 308 may include multiple comparators. In one embodiment, the response prediction module 306 may be used to predict a next set of frequencies based on historical data from the historical data module 310. The response prediction module 306 may use any suitable model in conjunction with historical frequency data used as data points. For example, in one embodiment, a quadratic or linear regression model may be used with a few data points from the historical data module 310, such as the last 3, 5, 10, or more data points to predict a next set of frequencies.

The historical data module 310, in some embodiments, is used to store historical data. For example, the historical data module 310 may store a history of frequencies produced by the security device. In one embodiment, the history of frequencies may include initial frequencies and any changes to the initial frequencies that have occurred over time. The historical data module 310 may include any suitable combination of hardware and software. In one embodiment, the historical data module 310 may include one or more memory devices. In another embodiment, the historical data module 310 may include a database.

In one embodiment, the update module 312 is used to update frequency information corresponding to a circuit that may be stored by the historical data module 310. For example, the update module 312 may verify that a frequency from a circuit of a security device has changed (e.g., over time, such as due to aging), then the update module 312 may provide the changed frequency to the historical data module 310 to store the changed frequency and/or to modify an latest version of the frequency for the corresponding circuit. In some embodiments, the update module 312 may determine that a frequency from a circuit of the security device has changed by receiving information from the frequency verification module 304 that a received frequency is within a predetermined range of a corresponding frequency from the circuit selection module 204, but has changed over time such that the stored frequency needs to be updated. Accordingly, the update module 312 may update the stored frequency. As another example, the update module 312 may update challenge/response pairs based on updates made to stored frequencies. For example, after a stored frequency is updated, a challenge/response pair that uses the stored frequency may be updated based on the updated frequency.

In certain embodiments, the update module 312 may update challenge/response pairs by simulating available models of the intrinsic chip identification module 104 with updated frequencies in place and/or by selecting challenge/response pairs based on a pre-characterized RO frequency and a challenge/response pair table.

Figure 4:
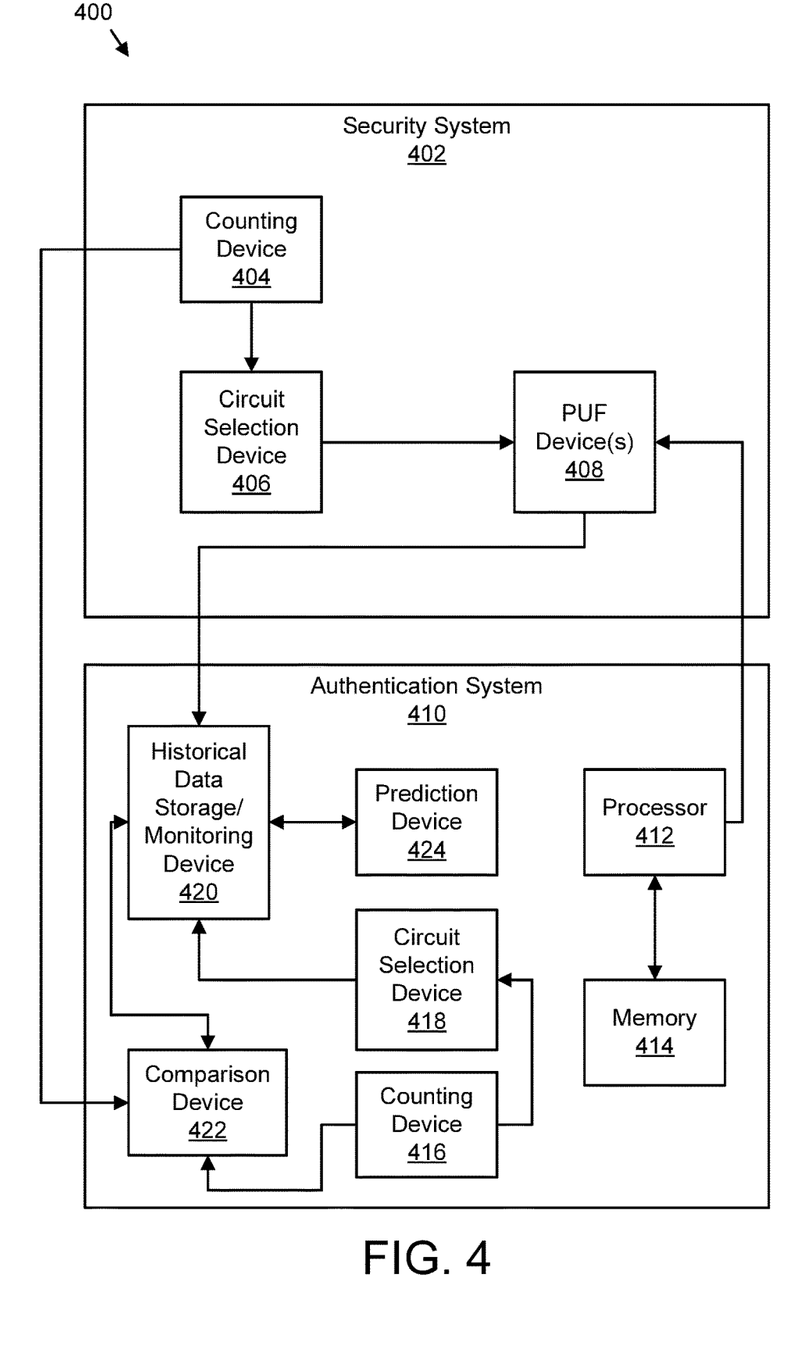
FIG. 4 is a schematic block diagram illustrating one embodiment of a system for authentication using intrinsic chip identification in accordance with one embodiment of the present invention.

FIG. 4 is a schematic block diagram illustrating one embodiment of a system 400 for authentication using intrinsic chip identification. The system 400 includes a security system 402 (e.g., security device, security apparatus) that includes an intrinsic chip used for authentication. Specifically, in the illustrated embodiment, the security system 402 includes a counting device 404, a circuit selection device 406, and one or more PUF devices 408. The system 400 also includes an authentication system 410 used for intrinsic chip authentication. In one embodiment, the authentication system 410 includes a processor 412, a memory 414, a counting device 416, a circuit selection device 418, a historical data storage/monitoring device 420, a comparison device 422, and a prediction device 424.

The counting device 404 and the counting device 416 may be substantially similar to the counter module 202 of FIG. 2. Indeed, each of the counting devices 404 and 416 are used to maintain a count that is synchronous between the counting devices 404 and 416. For example, with each authentication attempt, the count of the counting devices 404 and 416 may be synchronously changed so that the counting devices 404 and 416 maintain a matching count. As part of an authentication, both of the counting devices 404 and 416 may provide their counts to the comparison device 422 which determines whether the counts of the counting devices 404 and 416 match. As may be appreciated, the comparison device 422 may be substantially similar to the authentication module 206 of FIG. 2.

The circuit selection device 406 and the circuit selection device 418 may be substantially similar to the circuit selection module 204 of FIG. 2. Indeed, each of the circuit selection devices 406 and 418 receive a count from a respective counting device 404 or 416. The circuit selection devices 406 and 418 use the count to determine a set of circuits that may be used to produce a set of frequencies. In the security system 402, the circuit selection device 406 selects circuits of the one or more PUF devices 408. For example, in one embodiment, the circuit selection device 406 may select ROs determined by the circuit selection device 406. The one or more PUF devices 408 provide their corresponding frequencies to the authentication system 410. In one embodiment, the one or more PUF devices 408 provide their corresponding frequencies to the historical data storage/monitoring device 420.

In the authentication system 410, the circuit selection device 418 provides information regarding the selected circuits (e.g., frequencies corresponding to the selected circuits) to the historical data storage/monitoring device 420. The historical data storage/monitoring device 420 may determine whether the frequencies from the one or more PUF devices 408 are within a predetermined range of the frequencies from the circuit selection device 418. In some embodiments, the historical data storage/monitoring device 420 may communicate with the comparison device 422 to determine whether each frequency of the two sets of frequencies are within the predetermined range. In one embodiment, the historical data storage/monitoring device 420 may be substantially similar to the historical data module 310, the update module 312, the frequency verification module 304, and/or the response verification module 308 of FIG. 3.

The processor 412, in one embodiment, may include any known controller capable of executing computer-readable instructions and/or capable of performing logical operations. For example, the processor 412 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 412 executes instructions stored in the memory 414 to perform the methods and routines described herein.

The processor 412, in certain embodiments, may provide a challenge to the one or more PUF devices 408, resulting in a response being sent from the one or more PUF devices 408 to the authentication system 410. In one embodiment, the historical data storage/monitoring device 420 may receive the response. Moreover, the historical data storage/monitoring device 420 and/or the comparison device 422 may compare the response received from the one or more PUF devices 408 to an expected response. In one embodiment, the prediction device 424 may determine the expected response that may vary from a stored challenge/response pair. In certain embodiments, the prediction device 424 may be substantially similar to the response prediction module 306 described in FIG. 3.

The memory 414, in one embodiment, is a computer readable storage medium. In some embodiments, the memory 414 includes volatile computer storage media. For example, the memory 414 may include a RAM, including dynamic RAM ("DRAM"), synchronous dynamic RAM ("SDRAM"), and/or static RAM ("SRAM"). In some embodiments, the memory 414 includes non-volatile computer storage media. For example, the memory 414 may include a hard disk drive, a flash memory, or any other suitable non-volatile computer storage device. In some embodiments, the memory 414 includes both volatile and non-volatile computer storage media. In some embodiments, the memory 414 stores data relating to information to be provided to another device. In some embodiments, the memory 414 also stores program code and related data, such as an operating system or other controller algorithms operating on the remote unit authentication system 410.

In certain embodiments, the authentication system 410, such as the processor 412 of the authentication system 410, may use portions of the security system 402 to perform computing tasks while the security system 402 is not being used to perform authentications. Accordingly, even though components of the security system 402 may occupy a substantial amount of space, the components of the security system 402 may be used to perform functions other than just authentication or security related functions to make better use of the space.

The one or more PUF devices 408 may be any suitable PUF device. For example, the one or more PUF devices 408 may include a SRAM PUF, an eDRAM PUF, a ring oscillator ("RO") PUF, an arbiter PUF, and/or a NOR PUF. Although only one security system 402 is illustrated, the authentication system 410 may communicate with, monitor, and/or store historical data for any number of security systems 402.

During operation, in one embodiment, the authentication system 410 may request that the security system 402 send its counter information. Accordingly, the counting device 404 may send its counter information to the authentication system 410. If the counter information from the counting device 404 does not match the counter information of the counting device 416, the session may be closed.

If the counter information from the counting device 404 matches the counter information of the counting device 416, the authentication system 410 may then request that the security system 402 send RO frequencies. For example, the counting device 404 may send its count to the circuit selection device 406 which selects a set of ROs of the one or more PUF devices 408 to produce RO frequencies that are then provided to the authentication system 410. The authentication system 410 compares the received RO frequencies to stored frequencies identified by the circuit selection device 418. If the received RO frequencies are not within a predetermined threshold of the stored frequencies, then the session may be closed. In some embodiments, a second chance may be given to get a next set of ROs. If the next set of ROs are within the predetermined threshold, the authentication system 410 may update challenge/response pairs and/or frequencies using the first received RO frequencies.

If the received RO frequencies are within the predetermined threshold of the stored frequencies, the authentication system 410 may send a challenge to the security system 402. The one or more PUF devices 408 receive the challenge and produce a response that is provided to the authentication system 410. If the response matches the expected response of the authentication system 410, then authentication may be granted.

Figure 5:
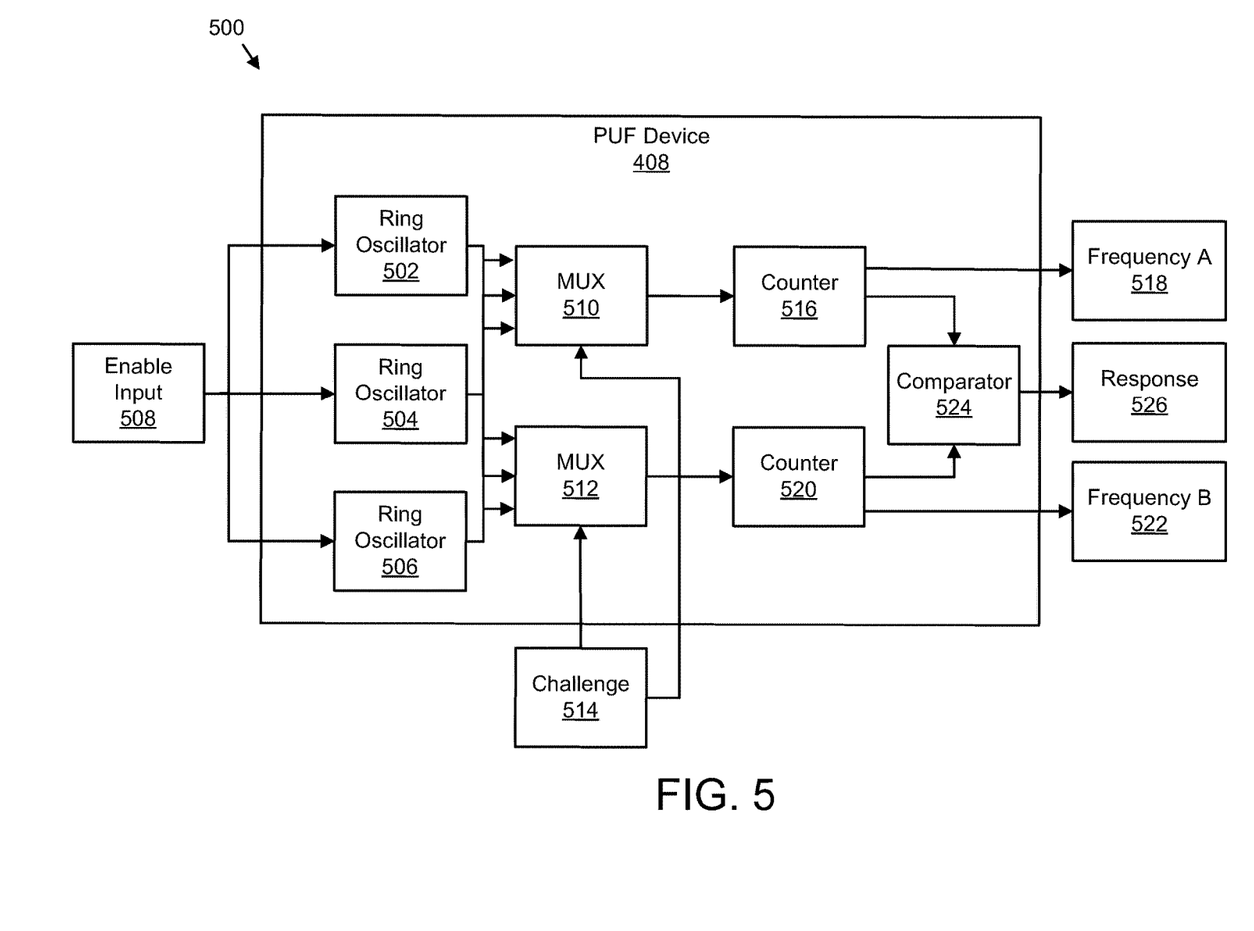
FIG. 5 is a schematic block diagram illustrating one embodiment of a PUF device in accordance with one embodiment of the present invention.

FIG. 5 is a schematic block diagram illustrating one embodiment of a PUF device 500. The PUF device 500 is one embodiment of a PUF device 408 of FIG. 4. The PUF device 408 includes ring oscillators ("ROs") 502, 504, and 506. The ROs 502, 504, and 506 may be any suitable ROs whose output oscillates between two voltage levels. Although three ROs are illustrated, the PUF device 408 may include any suitable number of ROs. In one embodiment, an enable input 508 is used to enable the ROs 502, 504, and 506. In other embodiments, the ROs 502, 504, and 506 may be enabled without an enable input 508.

The frequency outputs produced by the ROs 502, 504, and 506 are provided to multiplexers ("MUXs") 510 and 512. The MUXs 510 and 512 may be any suitable MUX that facilitates multiplexing signals. Although only two MUXs are illustrated, certain embodiments may include more than two MUXs. A challenge 514 is provided to the MUXs 510 and 512 to select which frequencies are passed through each of the MUXs 510 and 512. In one embodiment, the challenge 514 provided to the MUXs 510 and 512 is the same for each MUX. In such an embodiment, the frequency outputs produced by the ROs 502, 504, and 506 may be input to each MUX in a different order so that both MUXs 510 and 512 do not output the frequency output from the same RO. For example, the first, second, and third inputs to the MUX 510 may be from RO 502, RO 504, and RO 506 respectively, while the first, second, and third inputs to the MUX 512 may be from RO 504, RO 506, and RO 502 respectively. In certain embodiments, the challenge 514 provided to the MUXs 510 and 512 are each different so that any suitable pair of frequency outputs produced by the ROs 502, 504, and 506 may be selected.

The frequency output from the MUX 510 is provided to a counter 516 which counts the pulses from the frequency output over a predetermined period of time to result in a determined output frequency that is provided as an output frequency A 518. Referring to FIG. 4, the output frequency A 518 may be provided to the historical data storage/monitoring device 420 for storage and/or comparison with prior historical data. The frequency output from the MUX 512 is provided to a counter 520 which counts the pulses from the frequency output over the predetermined period of time to result in a determined output frequency that is provided as an output frequency B 522. Referring to FIG. 4, the output frequency B 522 may be provided to the historical data storage/monitoring device 420 for storage and/or comparison with prior historical data.

The counters 516 and 520 also provide their output frequency to a comparator 524 that compares the output frequency to determine which output frequency is greater. The comparator 524 then provides an output as a response 526 to the challenge 514. In one embodiment, the response 526 is either a logic "LOW" (e.g., 0) or a logic "HIGH" (e.g., 1). In some embodiments, the response 526 may be a logic "HIGH" if the frequency from counter 516 is greater than the frequency from counter 520, and the response 526 may be a logic "LOW" if the frequency from counter 516 is smaller than the frequency from counter 520. In other embodiments, the response 526 may be a logic "LOW" if the frequency from counter 516 is greater than the frequency from counter 520, and the response 526 may be a logic "HIGH" if the frequency from counter 516 is smaller than the frequency from counter 520. Referring to FIG. 4, the response 526 may be provided to the historical data storage/monitoring device 420 for storage and/or comparison with prior historical data. In some embodiments, the challenge 514 may be a series of binary inputs and the response 526 may be a series of binary outputs. The challenge 514 with its corresponding response 526 may be considered a challenge/response pair.

Figure 6:
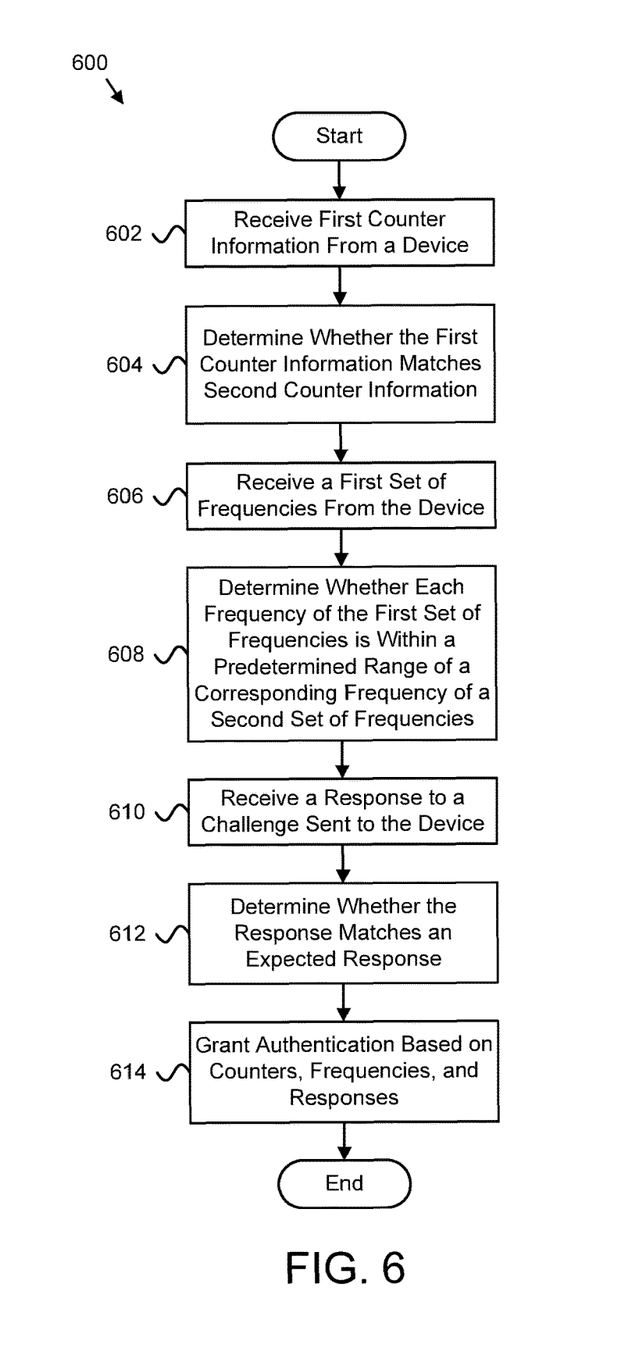
FIG. 6 is a schematic flow chart diagram illustrating one embodiment of a method for intrinsic chip identification in accordance with one embodiment of the present invention.

FIG. 6 is a schematic flow chart diagram illustrating one embodiment of a method 600 for intrinsic chip identification. In certain embodiments, the method 600 may be performed by the authentication system 410 or the intrinsic chip identification module 104. In one embodiment, the method 600 begins and receives 602 first counter information from a device (e.g., security system 402, counting device 404) in response to a second device (e.g., authentication system 410, intrinsic chip identification module 104) requesting the first counter information from the device. In some embodiments, the counter verification module 302 receives 602 the first counter information from the device. The method 600 may determine 604 whether the first counter information matches second counter information (e.g., from the counter module 202) of the second device. In one embodiment, the counter verification module 302 may determine 604 whether the first counter information matches the second counter information.

The method 600 may receive 606 a first set of frequencies from the device in response to the second device requesting the first set of frequencies from the device. In certain embodiments, the frequency verification module 304 may receive 606 the first set of frequencies from the device in response to the second device requesting the first set of frequencies from the device. The method 600 may determine 608 whether each frequency of the first set of frequencies is within a predetermined range of a corresponding frequency of a second set of frequencies. In some embodiments, the frequency verification module may determine 608 whether each frequency of the first set of frequencies is within the predetermined range of a corresponding frequency of the second set of frequencies. In certain embodiments, the first set of frequencies is determined based on the first counter information and the second set of frequencies is determined based on the second counter information.

In one embodiment, the first set of frequencies is determined by accessing a first memory corresponding to the first counter information and the second set of frequencies is determined by accessing a second memory corresponding to the second counter information. In another embodiment, the first set of frequencies is determined by a first PRNG and the second set of frequencies is determined by a second PRNG. In such an embodiment, the first PRNG uses the first counter information as an input and the second PRNG uses the second counter information as an input. In certain embodiments, the predetermined range blocks a frequency of the first set of frequency from being greater than a corresponding frequency of the second set of frequencies. In some embodiments, the predetermined range is updated over time. In such an embodiment, updating the predetermined range may include using a model applied to historical data to determine an updated predetermined range.

The method 600 may receive 610 a response to a challenge sent to the device. In one embodiment, the response verification module 308 may receive 610 the response to the challenge sent to the device. The method 600 may determine 612 whether the response matches an expected response. In certain embodiments, the response verification module 308 may determine 612 whether the response matches the expected response. In some embodiments, the expected response is updated over time as the response from the challenge changes over time.

The method 600 may grant 614 authentication in response to the first counter information matching the second counter information, each frequency of the first set of frequencies being within the predetermined range of a corresponding frequency of the second set of frequencies, and the expected response matching the response, and the method 600 may end. In various embodiments, the authentication module 206 may grant 614 authentication in response to the first counter information matching the second counter information, each frequency of the first set of frequencies being within the predetermined range of a corresponding frequency of the second set of frequencies, and the expected response matching the response.

Figure 7:
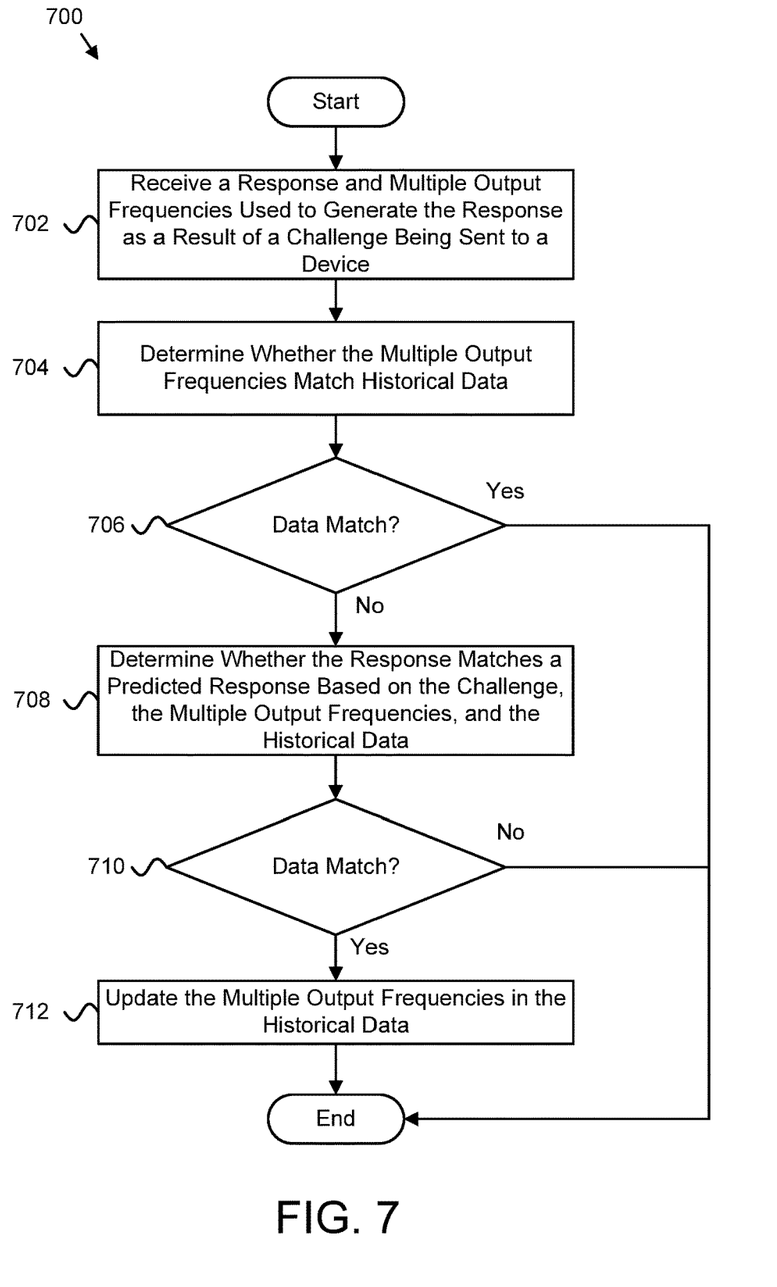
FIG. 7 is a schematic flow chart diagram illustrating one embodiment of a method for updating intrinsic chip identification in accordance with one embodiment of the present invention.

FIG. 7 is a schematic flow chart diagram illustrating one embodiment of a method 700 for updating intrinsic chip identification. In certain embodiments, the method 700 may be performed by the authentication system 410 or the intrinsic chip identification module 104. In one embodiment, the method 700 begins and receives 702 a response (e.g., response 526) and multiple output frequencies used to generate the response as a result of a challenge (e.g., challenge 514) being sent to a device (e.g., security system 402, PUF device 408). In one embodiment, the update module 312 receives 702 the response and the multiple output frequencies used to generate the response as a result of the challenge being sent to the device.

The method 700 determines 704 whether the multiple output frequencies match historical data corresponding to the multiple output frequencies. In certain embodiments, the historical data module 310 determines 704 whether the multiple output frequencies match historical data. If the multiple output frequencies match 706 the historical data, then the method 700 ends.

If the multiple output frequencies do not match 706 the historical data, the method 700 determines 708 whether the response matches a predicted response based on the challenge, the multiple output frequencies, and the historical data. In some embodiments, the historical data module 310 or the update module 312 determines 708 whether the response matches the predicted response based on the challenge, the multiple output frequencies, and the historical data. If the response does not match 710 the predicted response, then the method 700 ends.

If the response matches 710 the predicted response, the method 700 updates 712 the multiple output frequencies in the historical data, then the method 700 ends. In certain embodiments, the update module 312 updates 712 the multiple output frequencies in the historical data. In certain embodiments, the update module 312 may receive an updated one or more output frequencies and may store the updated one or more output frequencies in the historical data using the historical data module 310.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for intrinsic chip identification, comprising:
   receiving first counter information from a device;
   determining whether the first counter information matches second counter information;
   enabling authentication in response to the first counter information matching the second counter information;
   receiving a first set of frequencies from the device, wherein the first set of frequencies are selected based on the first counter information;
   determining whether each frequency of the first set of frequencies is within a predetermined range of a corresponding frequency of a second set of frequencies, wherein the second set of frequencies are selected based on the second counter information;
   selecting a challenge response pair comprising a challenge and a response as a result of each frequency of the first set of frequencies being within the predetermined range of a corresponding frequency of the second set of frequencies;
   transmitting the challenge to the device in response to selecting the challenge response pair;
   receiving the response as a result of the challenge being sent to the device;
   determining whether the response matches an expected response; and
   granting authentication as a result of the response matching the expected response.

2. The method of claim 1, wherein granting authentication comprises granting authentication in response to:
   the first counter information matching the second counter information;
   each frequency of the first set of frequencies being within the predetermined range of a corresponding frequency of the second set of frequencies; and
   the expected response matching the response.

3. The method of claim 1, wherein the device comprises a security apparatus, and the security apparatus comprises circuitry configured to perform a physically unclonable function ("PUF"), and the circuitry is shared with circuitry outside of the security apparatus for computations other than authentication.

4. The method of claim 3, wherein the circuitry comprises at least one of a counter, a second memory, a pseudo-random number generator ("PRNG"), and a ring oscillator ("RO").

5. The method of claim 1, wherein the first counter information is stored in a counter of the device and the second counter information is stored in a counter of a second device.

6. The method of claim 1, wherein the first set of frequencies is determined based on the first counter information and the second set of frequencies is determined based on the second counter information.

7. The method of claim 1, wherein the first set of frequencies is determined by accessing a first memory corresponding to the first counter information and the second set of frequencies is determined by accessing a second memory corresponding to the second counter information.

8. The method of claim 1, wherein the first set of frequencies is determined by a first pseudo-random number generator ("PRNG") and the second set of frequencies is determined by a second PRNG.

9. The method of claim 8, wherein the first PRNG uses the first counter information as an input and the second PRNG uses the second counter information as an input.

10. The method of claim 1, wherein the predetermined range blocks a frequency of the first set of frequencies from being greater than a corresponding frequency of the second set of frequencies.

11. The method of claim 1, wherein the expected response is updated over time.

12. The method of claim 1, comprising updating the predetermined range.

13. The method of claim 12, wherein updating the predetermined range comprises using a model applied to historical data to determine an updated predetermined range.

14. A system comprising:
a processor;
a first memory having program instructions embodied therewith, the program instructions executable by the processor; and
a security apparatus comprising circuitry configured to perform a physically unclonable function ("PUF"), wherein the circuitry comprises a first counter and a second counter, a first set of frequencies are selected based on the first counter, a second set of frequencies are selected based on the second counter, a challenge response pair is selected as a result of each frequency of the first set of frequencies being within a predetermined range of a corresponding frequency of the second set of frequencies, and authentications are enabled in response to the first counter matching the second counter and each frequency of the first set of frequencies being within a predetermined range of a corresponding frequency of the second set of frequencies;
wherein the system uses the security apparatus to perform authentications and the processor uses the security apparatus for computations while the security apparatus is not being used to perform authentications.

15. The system of claim 14, wherein the circuitry comprises at least one of a counter, a second memory, a pseudo-random number generator ("PRNG"), and a ring oscillator ("RO").

* * * * *